March 22, 1966  P. F. WAY  3,242,195
METHOD AND APPARATUS FOR FLUID BED REACTION
Filed Feb. 6, 1963
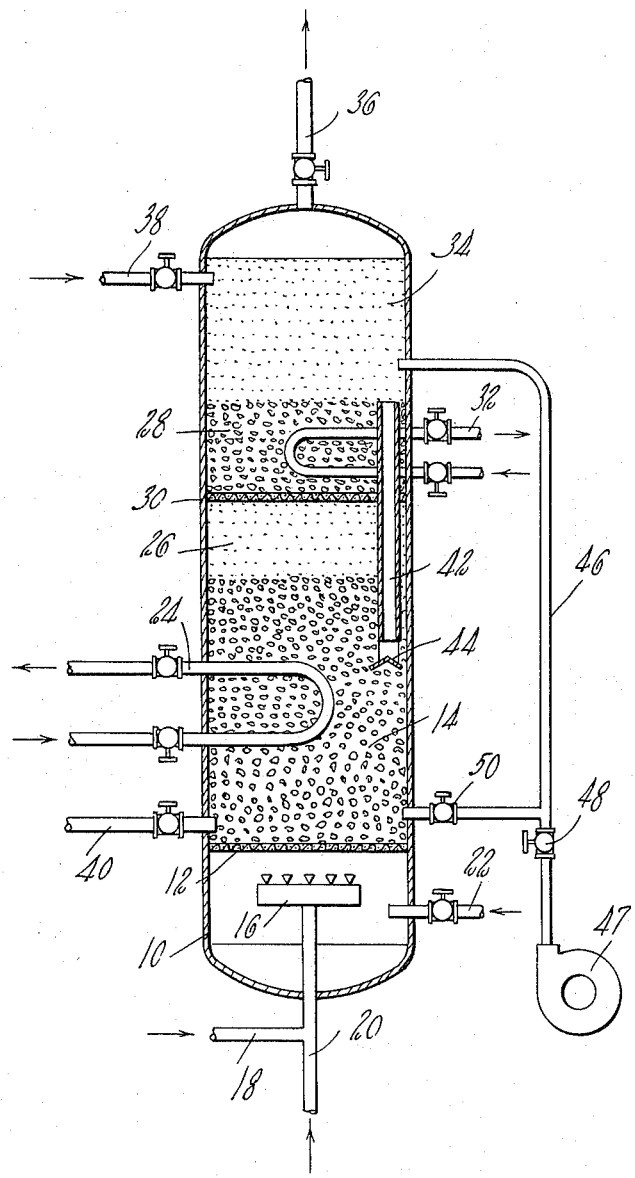

United States Patent Office 3,242,195
Patented Mar. 22, 1966

3,242,195
METHOD AND APPARATUS FOR FLUID BED REACTION
Peter F. Way, Cambridge, Mass., assignor to The Badger Company, Inc., Cambridge, Mass., a corporation of Massachusetts
Filed Feb. 6, 1963, Ser. No. 256,653
5 Claims. (Cl. 260—346.4)

This invention relates to a method and apparatus for carrying out a vapor-phase catalytic reaction in a bed of particulate catalyst maintained in a turbulent fluid condition by a stream of vaporized reactants within a reaction chamber.

In carrying out vapor-phase chemical reactions in fluidized turbulent beds of particulate catalyst, it has been proposed in order to control the temperature of reaction most effectively to provide two dense-phase catalyst beds, which may be separated by an intervening dilute-phase zone, with separate heat transfer units disposed in each dense-phase bed. Such an arrangement makes it possible to quench the reaction by cooling in the second dense-phase bed, the intervening dilute-phase zone, when present, serving to insulate the two dense-phase beds from each other and facilitate temperature control in each bed. However, it has been found that in some cases after operating for a period of time sufficiently long to establish equilibrium conditions in the system, the effectiveness of the cooling coils in the second dense-phase bed has been reduced, making it difficult to maintain the temperatures within the desired ranges.

It has now been found that the effectiveness of heat transfer and temperature control under such conditions can be greatly improved by providing continuous circulation of a portion of the particulate catalyst from the first or lower dense-phase bed to the second or upper dense-phase bed independently of the main stream of reactants and while maintaining the circulating portion separate from the intervening dilute-phase zone. It is believed that this expedient is effective because it compensates for classification of the catalyst particles, thereby limiting the fines concentration in the upper bed.

One object of the present invention is to provide an improved method and apparatus for controlling the temperature within a fluidized bed reaction having two dense-phase beds.

Another object is to provide for continuous circulation or transfer of catalyst particles from the lower to the upper dense-phase bed of catalyst in a fluid bed reactor having two beds.

Other and further objects will be apparent from the drawing and from the description which follows.

In the drawing:

FIG. 1 is a schematic diagram showing an embodiment of the present invention.

As shown in the drawing, there is provided a generally vertically arranged reaction chamber 10 which is provided with a transverse reticulate grid 12 which serves to maintain in position a dense-phase catalyst bed 14. The dense-phase catalyst bed is maintained in a turbulent fluidized state by the passage upward through it of a stream containing the reactants in vapor or gaseous form. Means for introducing the reactants is provided adjacent the bottom of chamber 10 in the form of a distributor 16 to which the reactants are supplied by means of lines 18, 20. A supplemental inlet line 22 may be provided for introducing a third or supplemental reactant if desired or for introducing an additional supply of one of the two reactants flowing through distributor 16. A temperature control coil 24 is disposed within the dense-phase catalyst bed 14 through which any desired or conventional heating or cooling liquid may be circulated in the usual manner in order to maintain the temperature within the range necessary to promote the desired reaction.

Immediately above the dense-phase catalyst bed 14 in reaction chamber 10 in the preferred embodiment of the invention is a dilute-phase zone 26 where separation of the catalyst particles from the stream of reaction mixture occurs. The high density within bed 14 together with the rapid and turbulent circulation of catalyst particles therein provide for a high heat-transfer coefficient between cooling coil 24 and the vapor-phase reaction mixture, facilitating the maintenance of uniform temperature conditions through the dense-phase bed. The low density within dilute-phase zone 26, on the other hand, provides poor heat-transfer characteristics, effectively thermally isolating dense-phase bed 14 from the secondary or quenching dense-phase catalyst bed 28 supported on grid 30 above dilute-phase bed 26. It will be understood, however, that this dilute-phase zone is not essential, and that the present invention is useful even when two or more dense-phase beds are contiguous, although the insulating effect of the zone is lost in the latter case. A temperature-control or cooling coil 32 is disposed within quenching bed 28 through which any desired heating or cooling medium may be circulated. The supply of heating or cooling medium for coil 32 may be and preferably is independent of the supply of heating or cooling medium for coil 24, thus making it possible to maintain the temperature within quenching bed 28 at a lower level than within reaction bed 14. A second dilute-phase catalyst zone 34 occurs above bed 28 within which the catalyst particles are disengaged from the stream of reaction mixture. The stream of reaction mixture containing the desired product flows upwardly through main outlet 36, whence it may pass to any conventional filter or separating system to remove entrained catalyst particles. Line 38 is provided near the upper end of reaction chamber 10 to permit the introduction of fresh or make-up catalyst either continuously or at any desired intervals while another line 40 may be provided adjacent the bottom of reaction bed 14 to permit unloading of exhausted catalyst, either continuously or at any desired intervals.

A conduit or standpipe 42 is generally vertically arranged within reaction chamber 10 and has its upper end located adjacent the upper portion of quenching bed 28 with its lower end opening into reaction bed 14. Baffle 44 is mounted in spaced relation beneath the lower end of conduit 42 to obstruct the upward flow of reaction mixture from entering the conduit. Conduit 42 serves as an overflow pipe to control the depth of quenching bed 28 and to return excess catalyst to reaction bed 14. This device automatically compensates for carry-over of catalyst particles in the stream of reactants from the reaction bed 14 to quenching bed 28 and ensures a stable system. A pipe 46 extends externally of the reaction chamber 10 from the lower portion of the first or lower dense-phase bed to the second or upper dense-phase bed, terminating at a level near the bed interface. A blower 47 is provided for inducing an upward flow of air or other suitable gas through pipe 46 for transporting the particles of catalyst upwardly through pipe 46, the air flow being controlled by valve 48 and the flow of catalyst particles being controlled by valve 50. The minimum rate of transfer of catalyst particles from the first to the second dense-phase beds through pipe 46 will vary somewhat depending upon the nature of the catalyst and the nature of the reaction, as well as the dimensions and geometry of the reaction chamber. In general, satisfactory results are obtained if the rate of transfer or circulation of catalyst particles from the first dense-phase bed to the second through pipe 46 is adjusted so that from 10% to 100% of the total weight of catalyst in the reaction chamber is transferred per hour, preferably from 20% to 50% per hour.

It will be apparent that conduit 42 must have a capacity at least as great as that of pipe 46 and must have sufficient additional capacity to return any catalyst particles carried over from reaction bed 14 to quenching bed 28 in the main stream of reactants.

It will be understood that one or more overflow conduits 42 may be employed as desired and that they may be located either circumferentially or centrally of reaction chamber 10 or they may be located externally of the chamber in order to maintain the desired depth in the quenching bed 28. It will also be understood that transfer pipe 46 may be disposed either externally of reaction chamber 10, which is preferred for ease of construction, or may be located internally if desired.

The continuous circulation or transfer of catalyst particles through pipe 46 serves to prevent any substantial increase in the relative proportion of small catalyst particles in the quenching bed 28, thus ensuring rapid and effective transfer of heat between coil 32 and the stream of the product-containing reaction mixture and the establishment of equilibrium conditions. This effective heat transfer minimizes any side reactions or decomposition which might otherwise occur in the reaction mixture. At the same time, the thermally insulating nature of dilute-phase zone 26 serves to minimize undesirable loss of heat from reaction bed 14.

In one embodiment of the present invention the reaction may be the exothermic vapor-phase oxidation of a vaporizable organic material such as naphthalene or orthoxylene to form phthalic anhydride by means of air or oxygen, in which case the catalyst used may be vanadium pentoxide. It will be understood, of course, that the use of the present invention is not confined to such an oxidation reaction, but may be employed in a variety of exothermic or other vapor-phase chemical reactions.

While the physical dimensions of the reaction chamber and of the catalyst beds will vary, of course, depending upon the nature of the reaction and of the catalyst as well as upon the throughput desired, it has been found that in the case of oxidation of naphthalene to phthalic anhydride using vanadium pentoxide catalyst, the feed rate for satisfactory results in from 0.01 to 0.5, preferably from 0.03 to 0.06, parts of naphthalene by weight per hour per unit weight of catalyst. The ratio of air to naphthalene by weight may be from 8 to 30, preferably from 10 to 15. While pre-heating of the mixture of air and naphthalene is desirable, it is not essential, and the naphthalene may be introduced into the reaction chamber either as a liquid or as a vapor. The rate of flow of the stream of reactants through the catalyst beds may be from 0.2 to 3.0 feet per second, preferably from 0.5 to 2.0 feet per second, with a contact time in reaction bed 14 from 5 to 30 seconds, preferably from 10 to 20 seconds. The reaction bed or dense-phase catalyst bed 14 consequently may be from 5 to 40 feet in depth, preferably from 10 to 30 feet deep, depending upon the rate of flow and contact time employed.

The quenching bed or secondary dense-phase catalytic bed 28 is from 3 to 20 feet in depth, preferably from 5 to 14 feet, so as to provide a contact time from 3 to 15 seconds, while the dilute-phase zone 26, serving as a thermo-insulating barrier between bed 14 and bed 28, may be from 1 to 20 feet deep, preferably from 10 to 15 feet, to provide a transit time of 1 to 15 seconds for the stream of reaction mixture.

The temperature within dense-phase catalytic reaction bed 14 is maintained from 300° to 450° C., preferably about 350° C., by means of the cooling medium circulated through cooling coil 24, while the flow of cooling medium through coil 32 is adjusted to maintain a temperature within quenching bed 28 of 200° to 320° C., preferably about 250° C.

Yields of phthalic acid in excess of 95 pounds per 100 pounds of naphthalene feed may be obtained by means of the present invention. Similarly improved results are obtainable in the oxidation of orthoxylene to phthalic acid and in some case of other exothermic vapor-phase reactions.

Although specific embodiments of the invention have been described herein, it is not intended to limit the invention solely thereto but to include all of the obvious variations and modifications within the spirit and scope of the appended claims.

What is claimed is:

1. The method of carrying out a vapor-phase catalytic reaction which comprises passing a stream containing reactant vapors upwardly through a first dense-phase bed of particulate catalyst maintained in a turbulent fluid bed and controlling the temperature within said dense phase at a level to promote said reaction, passing said stream from said first dense-phase bed through a dilute-phase zone of said catalyst above said first dense-phase bed and subsequently passing said stream through a second dense-phase bed of said catalyst above said dilute-phase zone while controlling the temperature in said second dense-phase bed at a level below that in said first dense-phase bed, continuously removing a portion of the catalyst from the first dense-phase bed and transferring it to the second dense-phase bed while separated from the main stream of reactant vapors, and removing catalyst from the upper portion of the second dense-phase bed when the depth of the bed exceeds a predetermined value and returning it to said first dense-phase bed.

2. The method as claimed in claim 1 in which said stream comprises a mixture of a vaporizable oxidizable organic material and air, and the rate of transfer of catalyst from the first to the second dense-phase beds is controlled to transfer from 10% to 100% of the total weight of catalyst in said beds per hour.

3. The method as claimed in claim 1 in which said reactant vapors comprise a mixture of naphthalene and from 8 to 30 times by weight of air, the catalyst comprises vanadium pentoxide, the temperature in the first dense-phase bed is maintained at 300° to 450° C., the temperature in the second dense-phase bed is maintained at 200° to 320° C., the rate of flow of said stream is controlled to provide a time of contact with the first dense-phase bed of 5 to 30 seconds, a time of contact with the dilute-phase zone of 1 to 15 seconds, and a time of contact with the second dense-phase bed of 3 to 15 seconds, and the rate of transfer of catalyst from the first to the second dense-phase bed is controlled to transfer from 10% to 100% of the total weight of catalyst in said beds per hour.

4. Apparatus for fluid bed catalytic vapor phase reaction comprising a reaction chamber having first grid means for maintaining and supporting a first dense-phase bed of particulate catalyst and means for supplying reactant vapors upwardly therethrough to provide dense-phase turbulence to said first dense-phase bed and to provide a first dilute-phase bed thereabove, and second grid means mounted above said first dilute-phase bed for supporting a second dense-phase bed and a second dilute-phase bed of particulate catalyst above said first dilute-phase bed, said means for passing a stream of reaction vapors upwardly including means for passing said stream from the first dilute-phase bed thereabove through said grid means of said second dense-phase bed to impart turbulence thereto, heat exchange means mounted in each said dense-phase bed for controlling the temperature thereof, means for removing catalyst from the upper portion of the upper dense-phase bed when the depth of said bed exceeds a pre-determined value and returning said catalyst to the first dense-phase bed, and means for continuously withdrawing a portion of the catalyst from the first dense-phase bed and transferring it to the second dense-phase bed while maintaining said portion separate from the main stream of reactants.

5. Apparatus as claimed in claim 4 in which the means for withdrawing and transferring a portion of the catalyst comprises a pipe and means for inducing an upward flow of transport gas through the pipe.

References Cited by the Examiner
UNITED STATES PATENTS

| | | | |
|---|---|---|---|
| 2,954,415 | 9/1960 | Topsoe | 260—346.4 |
| 3,080,382 | 3/1963 | Bousseau | 260—346.4 |

OTHER REFERENCES

Riley: Trans. Instn. Chem. Engrs., vol. 37, No. 6 (1959), pages 305–313 at pages 309–312.

HENRY R. JILES, *Primary Examiner.*

JOHN D. RANDOLPH, *Examiner.*